United States Patent
O'Brien

(10) Patent No.: US 6,178,475 B1
(45) Date of Patent: *Jan. 23, 2001

(54) MULTIMEDIA SYSTEM EMPLOYING TIMERS TO PROPERLY ALLOCATE BUS ACCESS

(75) Inventor: Rita M. O'Brien, Austin, TX (US)

(73) Assignee: Advanced Micro Devices Inc., Sunnyvale, CA (US)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/359,286

(22) Filed: Dec. 19, 1994

(51) Int. Cl.$^7$ .................................................. G06F 13/14
(52) U.S. Cl. .......................... 710/116; 710/117; 710/113
(58) Field of Search ................................... 395/860, 856, 395/848, 800, 728–732, 287, 290, 291, 293, 299, 478, 494, 200.05; 340/825.5, 825.51; 364/131–134; 710/40, 36, 25, 107, 110, 111, 113, 116, 120, 240, 241, 242, 243, 244, 117; 711/253

(56) References Cited

U.S. PATENT DOCUMENTS

| | | |
|---|---|---|
| 4,285,038 | 8/1981 | Suzuki et al. . |
| 5,072,420 | 12/1991 | Conley et al. . |
| 5,168,568 * | 12/1992 | Thayer et al. ........................ 395/305 |
| 5,247,617 | 9/1993 | Olson . |
| 5,276,887 * | 1/1994 | Haynie ................................ 395/294 |
| 5,283,902 * | 2/1994 | Dorn ................................... 395/301 |
| 5,301,332 | 4/1994 | Dukes ................................. 395/732 |
| 5,377,332 * | 12/1994 | Entwistle et al. .................... 395/297 |
| 5,392,033 | 2/1995 | Oman et al. . |
| 5,410,652 | 4/1995 | Leach et al. . |
| 5,430,848 * | 7/1995 | Waggener ............................ 395/303 |
| 5,463,624 * | 10/1995 | Hogg et el. ......................... 370/461 |
| 5,499,345 * | 3/1996 | Watanabe ............................ 395/297 |
| 5,778,200 * | 7/1998 | Gullick ................................ 710/113 |
| 5,796,961 | 12/1994 | O'brien . |

FOREIGN PATENT DOCUMENTS

| | | |
|---|---|---|
| 0 125 809 | 11/1984 | (EP) . |
| 0 625 753 | 11/1994 | (EP) . |
| 2001463 | 1/1979 | (GB) . |
| 52-016674 | 8/1993 | (JP) . |
| WO 94/00834 | 1/1994 | (WO) . |

OTHER PUBLICATIONS

IBM *Technical Disclosure Bulletin*, vol. 37, No. 10, 10/94, pp. 461–462.

* cited by examiner

Primary Examiner—Larry D. Donaghue
(74) Attorney, Agent, or Firm—Foley & Larnder

(57) ABSTRACT

An arbiter connects a plurality of devices to a bus. The arbiter determines priority among the devices based on minimum access intervals associated with the devices and timers which keep track of the elapsed time since each device last had access to the bus. The timers can be configured to either count up from zero to the minimum access interval of each device or count down from the minimum access interval of each device to zero. The arbiter can also adjust the minimum access intervals of the various devices based upon factors such as the amount of data required by the device, the amount of data most recently received by the device and the transfer rate of the device. The arbiter thus optimizes bus usage while minimizing the likelihood of a given device not functioning based on an ability to access the bus due to contention with other devices.

16 Claims, 2 Drawing Sheets

MULTIMEDIA SYSTEM EMPLOYING TIMERS TO PROPERLY ALLOCATE BUS ACCESS

BACKGROUND OF THE INVENTION

When many devices are connected to a data bus, such as in a multi-media application, conflicts will occur where two devices request access to the bus at the same time. To resolve these conflicts, arbiters have been developed to grant bus access to the device having the highest priority. Thus, when two devices are in contention for the bus, the arbiter first gives access to the device with the higher priority of the two and subsequently gives access to the device with the lower priority.

In a system with such an arbiter, a device with a very high priority will get frequent access to the bus while a device with a low priority will get infrequent access to the bus. This can present a problem when the devices are assigned their priorities during system initialization or boot-up such that the relative priorities of the devices do not change over time. A situation can exist where a low priority device needs access to the bus in order to continue functioning but cannot obtain access because a high priority device which does not necessarily need access happens to be requesting bus access coincidentally. Thus, although the system is granting access on a priority basis, inefficiencies can result where low priority devices experience idle time or malfunction.

SUMMARY OF THE INVENTION

It is thus an object of the present invention to improve the efficiency of systems where multiple devices request access to a data bus by providing an arbiter with a capability for updating the priority of the respective devices during processing. More specifically, the arbiter of the present invention will utilize timers corresponding to each device. The timers will indicate an elapsed time since each device last had access to the bus. The arbiter will then grant access to the bus based on the values of the timers.

It is a further object of the present invention to provide a method of granting bus access to a plurality of devices via a bus arbiter which determines priority based upon the time since each device last had access to the bus.

It is a further object of the invention to provide an arbiter which calculates the priority of each device based not only on the time since each device last had access to the bus, but also on the amount of data needed by the device.

It is a further object of the invention to provide an arbiter which calculates the priority of each device based not only on the time since each device last had access to the bus and on the amount of data needed by the device, but also on the data transfer rate of each device.

One embodiment of the present invention comprises a bus connected to a plurality of devices through an arbiter. At least one of the devices has a corresponding timer indicating a value representing the elapsed time since the device last accessed the bus. The arbiter thus grants access to the bus based on the value of the timer. This embodiment can be expanded to associate a timer with each device. This embodiment can also be expanded to include a minimum access interval for one or more of the devices. The timer can then either count up to the minimum access interval from zero, or count down to zero from the minimum access interval. The arbiter can then determine the relative priority for each device based on the time since the device last had access to the bus and the minimum access interval for the device.

BRIEF DESCRIPTION OF THE DRAWINGS

These and other objects of the invention will become apparent from a review of the drawings wherein.

DETAILED DESCRIPTION OF THE PREFERRED EMBODIMENTS

Figure 1:
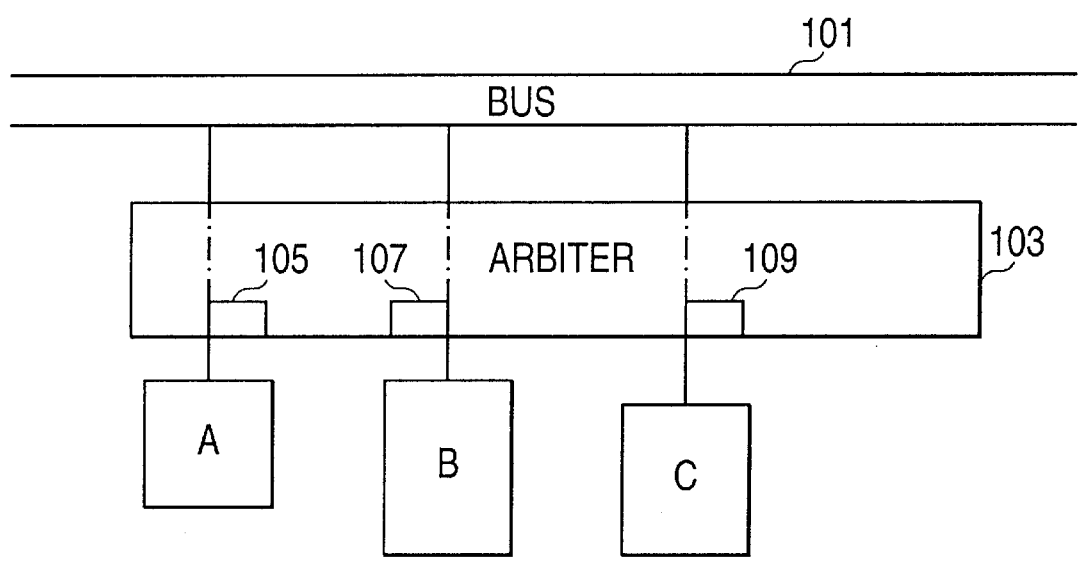
FIG. 1 shows an example of the invention where three devices are connected to a bus via an arbiter.

FIG. 1 shows three devices A, B and C connected to bus 101 through arbiter 103. Devices A, B and C can be any devices which communicate via bus 101. The connection of each of these devices to bus 101 can be associated with a timer. For example, as shown in FIG. 1, arbiter 103 contains timers 105, 107 and 109 associated respectively with devices A, B and C.

Figure 2:
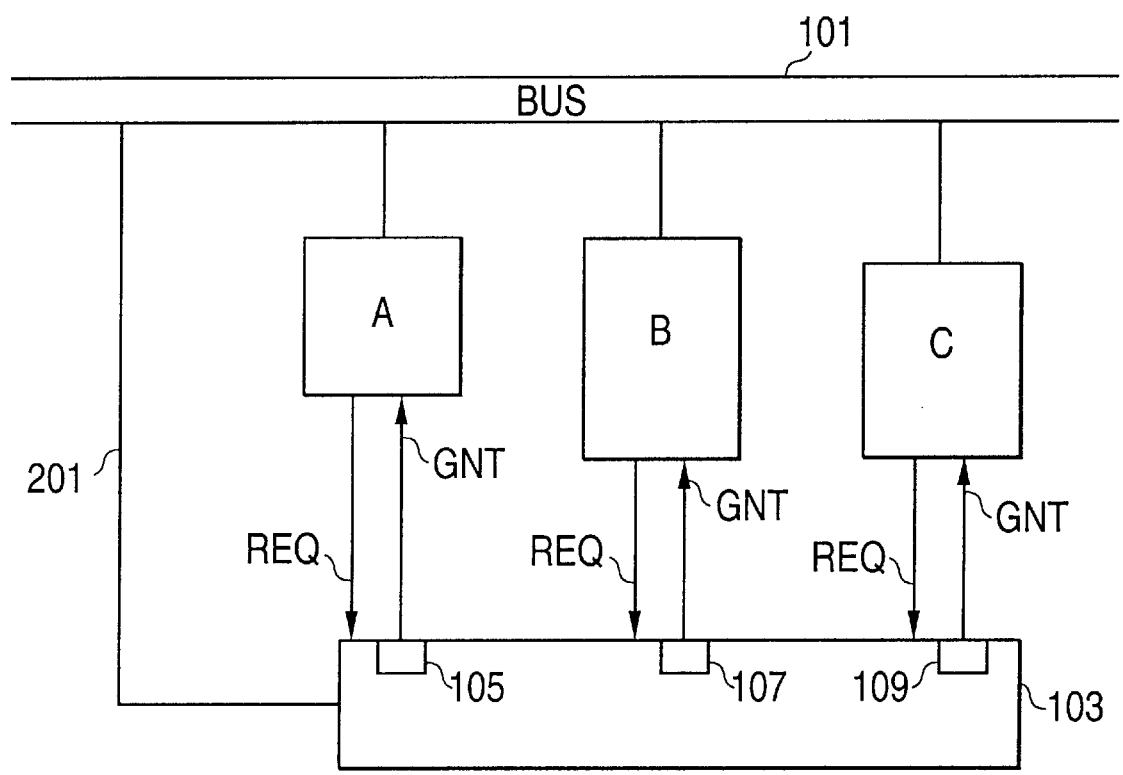
FIG. 2 shows an alternative connection of three devices to a bus and an arbiter according to the invention.

Alternatively, arbiter 103 can be connected in parallel to connections between devices A, B and C to bus 101 as shown in FIG. 2. In this configuration, timers 105, 107 and 109 are each connected to their respective devices A, B and C via a request line REQ and a grant line GNT. Arbiter 103 is also connected to bus 101 via line 201 to inform bus 101 of which device is granted access. The following discussion focuses on describing the embodiment of FIG. 1 in comparison to conventional arbiters. One skilled in the art will understand that similar operations can be performed using the embodiment of FIG. 2.

The timers will keep track of the elapsed time since each device last had access to bus 101. This enables arbiter 103 to base its priority decisions on these elapsed times.

For example, suppose devices A, B and C are video processing devices which receive data from bus 101 for video processing and subsequent display. Further, assume that devices A, B and C are different types of video processing devices targeted to different video applications, such that they have different data input requirements.

For example, assume device A is a video processor related to a teleconferencing application whereas devices B and C are video processors related to full motion video applications. Since teleconferencing does not require the same frame update rate as full motion video, device A has lower data input requirements compared to the other devices. Further, assume device B is a video processor engaged in color video while device C is a video processor engaged in black and white video. Therefore, since color video requires more data than black and white video, device B would require more data via bus 101 than device C.

If each time a device accesses bus 101 it receives the same amount of data, for example, one packet of data, then the differing data input requirements of the three devices translate into differing bus access requirements. Thus, device B requires the greatest amount of data and therefore requires the most frequent bus access. Similarly, device C requires the second greatest amount of data and therefore requires the second most frequent bus access, while device A requires the least amount of data and therefore the lowest amount of bus access.

It should also be clear that although each of the devices needs to access bus 101 at a different rate, if any of the devices is not granted access to bus 101 at a sufficiently frequent interval, a device malfunction may result.

In a conventional arbitration system, the relative priorities of devices A, B and C would be assigned at the time of system boot-up. For the example discussed above, device B would be given the highest priority, device C would be given the second highest priority and device A would be given the lowest priority.

A drawback of conventional arbitration systems, however, is that these respective priorities would be maintained indefinitely. Thus, any time device B requests access to bus 101, it will be given access regardless of whether it truly needs to access bus 101. As a result, even if device A needs access to bus 101, its access request will be superseded by the priority of either device B or device C if either of these devices is coincidentally requesting bus access, regardless of their actual need for bus access.

For simplicity, we are assuming that devices A, B and C receive data from bus 101 in like-size packets. Thus, when device A accesses bus 101, it receives the same amount of data that device B receives when device B accesses bus 101, which is identical to the amount of data device C receives when device C accesses bus 101. As will be discussed later, this requirement for receiving identical amounts of data for each bus access is purely by way of example to assist in understanding a first embodiment of the invention. A subsequent embodiment will address the situation where the devices can receive different amounts of data when accessing bus 101.

For the present example, therefore, presume the given applications (device A: teleconferencing, device B: color video, device C: black and white video) and the fixed packet size translate into separate minimum access intervals for each device. For example, presume that in order to function properly, device A must access bus 101 at least once every 10 microseconds. Similarly, assume device B must access bus 101 every microsecond and device C must access bus 101 every 2 microseconds. Each time device A accesses bus 101, timer 105 is set in order to keep track of the elapsed time since device A last had access.

This setting of timer 105 can be accomplished in two different ways. In a first way, timer 105 is reset to zero every time device A accesses bus 101. Timer 105 then counts upward to keep track of the amount of time since the last access. Arbiter 103 then compares the content of timer 105 with a previously stored minimum access interval associated with device A. As discussed above, for this example, the minimum access interval for device A is 10 microseconds. Therefore, arbiter 103 compares the content of timer 105 with 10 microseconds, the difference therebetween representing the amount of time left in the minimum access interval. Alternatively, timer 105 can be reset to the minimum access interval associated with device A (10 microseconds) each time device A accesses bus 101. In this example, timer 105 counts down toward zero such that the content of timer 105 represents the amount of time left in device A's minimum access interval. Thus, arbiter 103 determines device A's minimum access interval by merely reading timer 105.

In a similar fashion, timer 107 can either be reset to zero and count up to 1 microsecond each time device B accesses bus 101 or be reset to 1 microsecond and count down toward zero each time device B accesses bus 101. Similarly, if a count-up scheme is employed, timer 109 is reset to zero each time device C accesses bus 101 and if a count-down scheme is employed, timer 109 is reset to 2 microseconds each time device C accesses bus 101.

Arbiter 103 then grants devices A, B and C access to bus 101 based upon the values of their corresponding timers 105, 107 and 109. For example, suppose devices A and B are simultaneously requesting access to the bus. Further, suppose the timers are reset to zero each time their respective device accesses the bus. Further, suppose timer 105 contains a value of 2 microseconds and timer 107 contains a value of 0.8 microseconds. These values indicate that it has been 0.8 microseconds since device B last had access to bus 101 and that it has been two microseconds since device A last had access to bus 101. Since device B needs access every microsecond, arbiter 103 determines that device B has a greater need for access to the bus and grants access to device B. This is because device B must obtain access within the next 0.2 microseconds whereas device A does not need access to the bus for another 8 microseconds. Therefore, in this example, device B is granted priority.

In another example, suppose devices A and C are requesting simultaneous access to the bus. Further, suppose timer 105 indicates that it has been 9 microseconds since device A last had access to the bus while timer 109 indicates that it has been 0.3 microseconds since device C last had access to the bus. In this situation, device A is granted access to the bus since device A must access the bus within the next 1 microsecond whereas device C requires access within the next 1.7 microseconds.

Taking an extreme example, suppose all three devices are requesting access to the bus and timer 105 indicates that it has been 9.8 microseconds since device A had access to bus 101, timer 107 indicates that it has been 0.5 microseconds since device B had access to bus 101 and timer 109 indicates that it has been 1.7 microseconds since device C had access to bus 101. Here, priority is given to device A, then to device C and finally to device B, since device A must access bus 101 within the next 0.1 microseconds, device C must access bus 101 within the next 0.3 microseconds and device B must access bus 101 within the next 0.5 microseconds. Therefore, the device which would be given the lowest priority by a conventional arbiter would receive the highest priority in this example. The arbiter of the present invention thus ensures that device A does not experience any malfunction merely because devices B and C are coincidentally requesting access.

In an alternative embodiment, arbiter 103 can base its priority decisions not only on the content of timers 105, 107 and 109 but also on other factors. These can include, for example, the amount of data required by each device and the rates of data transferred to each device. Thus, suppose device B from the above example can be reconfigured such that it requires access less frequently but receives a greater amount of data each time it has access. For example, suppose devices A and C continue to receive one packet of data each time they access bus 101 but device B is configured such that it receives two packets of data each time it accesses bus 101. Therefore, device B's minimum access interval can be raised from 1 microsecond to 2 microseconds. Arbiter 103 then grants priority based on this new minimum access interval.

Alternatively, the number of packets of data provided to each device can be variable such that arbiter 103 can set the minimum access intervals of each device based upon the amount of data each device received during its most recent bus access. For example, if device B requires one packet of data every microsecond but received four packets of data during its last access, arbiter 103 can set timer 107 such that device B only requires access within the next 4 microseconds. In this case, the minimum access interval for each device is a function of the way in which data intended for each device is supplied to bus 101.

Alternatively, devices A, B and C can have differing transfer rates which can variably affect their minimum access intervals. For example, consider the first example presented earlier where all three devices function with the same data transfer rate. Now, presume that the data transfer rate of each device is based on a given application employed by each device. For example, suppose device B's 1 microsecond minimum access interval includes a 0.3 microsecond data transfer period associated with a given application whereas device B can sometimes be engaged in an alternative application for which there is only a 0.1 microsecond data transfer period. In the latter case, when device B is configured for the alternative application, the minimum access interval for device B can be increased to 1.2 microseconds to take advantage of its shorter data transfer period. Thus, arbiter 103 can monitor the configurations of devices A, B and C and adjust the minimum access intervals associated therewith based upon data transfer rates related to various applications.

Thus, in various alternative ways, arbiter 103 can assign priorities to devices A, B and C to minimize the likelihood that any of the devices will not function due to inaccessibility of bus 101 based on contention for bus access with the other devices. The examples discussed above are based, for simplicity, on three devices accessing the bus. Clearly, however, any number of devices can access the bus and be in mutual contention. The various embodiments of the present invention described above can thus be employed to optimize bus usage.

While several embodiments of the invention have been described, it will be understood that it is capable of further modifications, and this application is intended to cover any variations, uses, or adaptations of the invention, following in general the principles of the invention and including such departures from the present disclosure as to come within knowledge or customary practice in the art to which the invention pertains, and as may be applied to the essential features hereinbefore set forth and falling within the scope of the invention or the limits of the appended claims.

What is claimed is:

1. A bus access arbitration system, comprising:
   a bus;
   a plurality of devices, at least one of the plurality of devices being associated with a corresponding timer, the timer being reset to zero each time the at least one device accesses the bus, such that the timer has a value indicating an elapsed time since the at least one device last accessed the bus; and
   an arbiter connecting the devices to the bus, the arbiter granting the devices access to the bus based on the value of the timer.

2. A bus access arbitration system as in claim 1, wherein each of the devices is associated with a corresponding timer, the corresponding timer being reset to zero each time its corresponding device accesses the bus, such that each timer has a value indicating an elapsed time since its corresponding device last accessed the bus, and wherein the arbiter grants the devices access to the bus based on the values of the timers.

3. A bus access arbitration system as in claim 1, wherein the arbiter contains a previously determined minimum access interval for the at least one device, such that a relative priority for the at least one device increases as the value of the timer approaches the minimum access interval.

4. A bus access arbitration system as in claim 2, wherein the arbiter contains a previously determined minimum access interval for each device, such that a relative priority for each device increases as the value of its corresponding timer approaches its minimum access interval.

5. A bus access arbitration system as in claim 2, wherein the arbiter further contains information indicative of an amount of data each device is prepared to transfer, and wherein the arbiter further grants the devices access to the bus based on the amount of data each device is prepared to transfer.

6. A bus access arbitration system as in claim 5, wherein the arbiter further contains information indicative of a data transfer rate for each device, and wherein the arbiter further grants the devices access to the bus based on their data transfer rates.

7. A bus access arbitration system, comprising:
   a bus;
   a plurality of devices, at least one of the plurality of devices being associated with a corresponding timer, the timer being reset to a previously determined minimum access interval associated with the at least one device each time the at least one device accesses the bus, the timer counting down toward zero; and
   an arbiter connecting the devices to the bus, the arbiter granting the devices access to the bus based on the value of the timer.

8. A bus access arbitration system as in claim 7, wherein each of the devices is associated with a corresponding timer, the corresponding timer being reset to a previously determined minimum access interval each time its corresponding device accesses the bus, each timer counting down toward zero, and wherein the arbiter grants the devices access to the bus based on the values of the timers.

9. A bus access arbitration system as in claim 8, wherein the arbiter further contains information indicative of an amount of data each device is prepared to transfer, and wherein the arbiter further grants the devices access to the bus based on the amount of data each device is prepared to transfer.

10. A bus access arbitration system as in claim 9, wherein the arbiter further contains information indicative of a data transfer rate for each device, and wherein the arbiter further grants the devices access to the bus based on their data transfer rates.

11. A bus access arbitration system as in claim 8, wherein the device corresponding to the timer with a lowest relative value is granted a highest priority and the device corresponding to the timer with a highest relative value is granted a lowest priority.

12. A method of granting bus access to a plurality of devices via a bus arbiter, comprising the steps of:
   setting a timer corresponding to each device;
   resetting the corresponding timer each time its corresponding device accesses the bus;
   assigning a priority to each device based on a value of its corresponding timer; and
   granting the devices access to the bus based on their assigned priorities.

13. The method of claim 12, further comprising the steps of:
   storing a previously determined minimum access time for each device in the arbiter; and
   calculating the difference between the timer value and the minimum access time for each device;

wherein the setting step sets the timers to zero, the resetting step resets the timers to zero, the timers count up from zero, and the priority assigning step bases the device priorities on the calculated differences between the timer values and their corresponding minimum access times.

14. The method of claim 12, wherein each device has an associated transfer rate indicative of the speed at which the device communicates with the bus and the step of assigning a priority to each device is also based on the transfer rate of each device.

15. The method of claim 12, wherein the arbiter contains information indicative of an amount of data each device each device is prepared to transfer, and wherein the arbiter further grants the devices access to the bus based on the amount of data each device is prepared to transfer.

16. The method of claim 12, wherein the setting step sets the timers to a previously determined minimum access interval for the corresponding device, the resetting step resets the timers to the previously determined minimum access interval for the corresponding device, the timers count down toward zero, and the priority assigning step assigns the highest priority to the device whose corresponding timer has the lowest value and the lowest priority to the device whose corresponding timer has the highest value.

* * * * *